United States Patent [19]
Hopp

[11] 3,948,532
[45] Apr. 6, 1976

[54] CAPTIVE TYPE SPARKPLUG GASKET
[76] Inventor: Harold P. Hopp, 35 Industrial Road, Lodi, N.J. 07644
[22] Filed: May 23, 1975
[21] Appl. No.: 580,486

[52] U.S. Cl. .................. 277/9.5; 277/11; 277/166
[51] Int. Cl.² ........................................... F16J 15/08
[58] Field of Search .............. 277/9.5, 11, 213, 166

[56] References Cited
UNITED STATES PATENTS
3,099,456   7/1963   Hopp .................................. 277/166

*Primary Examiner*—Robert I. Smith
*Attorney, Agent, or Firm*—Charles E. Temko

[57] ABSTRACT
A captive spark plug gasket in which the means for maintaining the captive relation is in the form of an inwardly directed flange, the free edge of which is provided with a plurality of staked undulations to provide the equivalent of metal which is appreciably thicker than the original thickness of the metal stock from which the gasket is formed. During a staking operation, the inwardly directed flange is inwardly folded to reduce the effective diameter of the free edge thereof, so as to be positioned to lie upon the unthreaded undercut area adjacent the lower transverse surface of the plug body. Because of the increased thickness of the free edge of the inwardly folded flange, cross threading with respect to the thread on the shank does not occur when the plug is unthreaded from an engaged cylinder head opening, and the gasket remains captive on removal.

2 Claims, 9 Drawing Figures

CAPTIVE TYPE SPARKPLUG GASKET

BACKGROUND OF THE INVENTION

This invention relates generally to the field of spark plug gaskets, and more particularly to an improved captive type which remains in engaged condition upon the threaded shank of a spark plug body during installation and removal. The spark plug gasket art is presently at a highly developed state, and the invention lies in specific constructional details permitting improved reliability with respect to captivity.

It is known in the art to provide gaskets having staked out portions which deform upon installation of the plug within a cylinder head opening to captivate the gasket prior to removal, as illustrated, for example, in my prior U.S. Pat. No. 3,099,456 granted July 30, 1963. It is also known, as shown in my prior U.S. Pat. Nos. 3,156,477 granted Nov. 10, 1964; and 3,299,504 granted June 24, 1967, to provide a staking tool for deforming a locking flange forming part of a gasket to an undercut-engaging position to achieve captivation of the gasket prior to plug installation.

In order to be readily deformed under compression during installation, with adequate metal flow, gaskets of this type are normally formed from relatively thin gauge steel. The locking flange forming part of the gasket is normally of the same thicknesses as the blank from which the gasket is formed. When a plug has remained in installed condition over a relatively long period of time, rust, grime, and other substances tend to adhere the gasket in position bordering the spark plug opening recess. In such cases, when an attempt is made to remove the plug, the locking projections on the gasket instead of remaining attached to the plug body on occasion tend to "cross-thread" upon the threaded shank of the plug body, and unthread with rotation of the shank to remain in situ. This condition often remains undiscovered through failure to observe the shank of the plug removed, and when the replacement plug is engaged it is impossible to properly seal the same because of the presence of the additional unremoved gasket, as a result of which the electrodes of the spark plug are not properly positioned within the cylinder, and improper sealing may occur.

SUMMARY OF THE INVENTION

Briefly stated, the invention contemplates the provision of a captive type gasket of the class described including a plurality of interconnected compressible flanges which accomplish a sealing function between the plug body and the cylinder head, and an inwardly extending generally angularly disposed flange which is staked into position to engage the undercut portion of the threaded shank of the plug body. The free edge of the last mentioned flange is displaced inwardly or outwardly at periodic intervals to provide an effective width approximating the pitch of the thread on the threaded portion of the shank to resist the tendency of the gasket to cross-thread when the plug is removed from the cylinder head, and thereby remain attached to the plug.

BRIEF DESCRIPTION OF THE DRAWING

In the drawing, to which reference will be made in the specificiation, similar reference characters have been employed to designate corresponding parts throughout the several views.

DETAILED DESCRIPTION OF THE DISCLOSED EMBODIMENT

Figure 1:
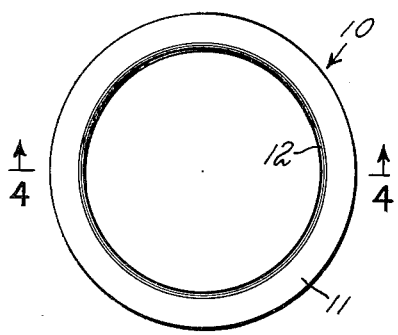
FIG. 1 is a top plan view of a captive type spark plug gasket embodying the invention.
Figure 2:
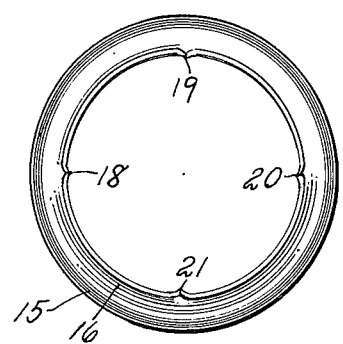
FIG 2 is a bottom plan view thereof.
Figure 3:
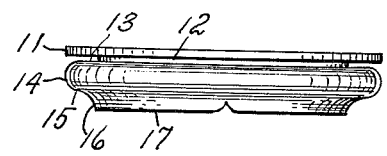
FIG. 3 is a side elevational view thereof.
Figure 4:
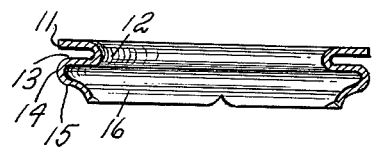
FIG. 4 is a central longitudinal sectional view thereof as seen from the plane 4—4 in FIG. 1.

In accordance with the invention, the device, generally indicated by reference character 10 is illustrated in uncompressed condition in FIGS. 1 through 4, inclusive. The gasket is formed as a multiple stage stamping operation from thin gauge sheet metal stock, to include a first sealing flange 11 interconnected by a bend portion 12 to a second sealing flange 13 in turn interconnected by a bend portion 14 to a third sealing flange 15. FIGS. 5 through 9, inclusive, illustrate the device after partial compression obtained when the same is staked into captive relation with an associated spark plug.

Extending inwardly from the third flange 15 is an angularly disposed locking flange 16, the free edge 17 of which is provided with a plurality of offset areas 18, 19, 20 and 21 which are obtained as a result of mechanical forming in either a radially inward or radially outward direction.

Figure 5:
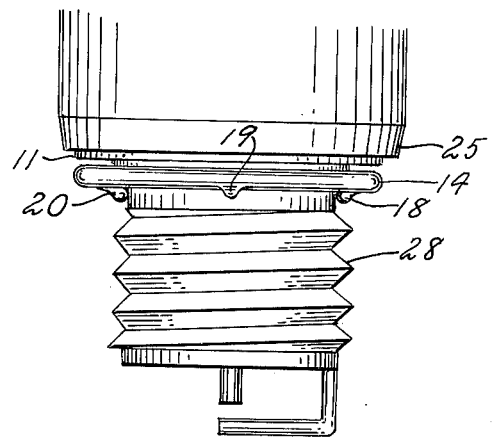
FIG. 5 is a fragmentary view in elevation of the gasket shown in FIG. 3 in installed condition upon a spark plug body, with a locking flange thereof staked inwardly to engage an undercut separating the threaded portion of a downwardly extending shank from the main portion of the plug body.
Figure 6:
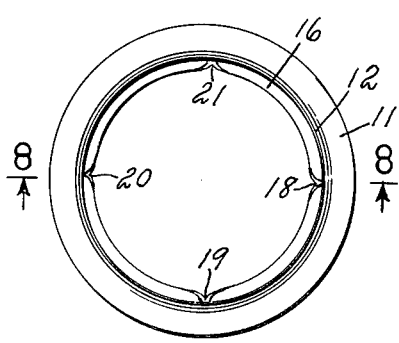
FIG. 6 is a top plan view corresponding to that seen in FIG. 1, but showing the device in partially compressed condition resulting from the staking operation shown in FIG. 5.
Figure 7:
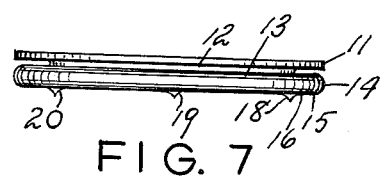
FIG. 7 is a side elevational view as seen from the right hand portion of FIG. 6.
Figure 8:
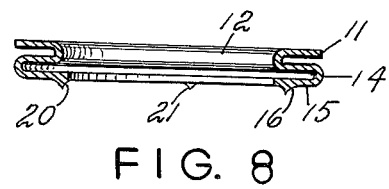
FIG. 8 is a transverse sectional view as seen from the plane 8—8 in FIG. 6.
Figure 9:
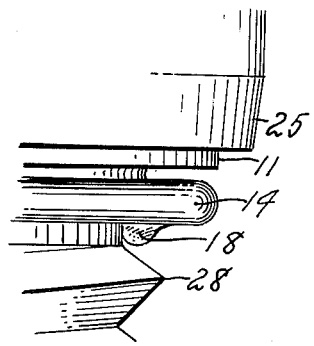
FIG. 9 is an enlarged fragmentary view in elevation corresponding to the upper right hand portion of FIG. 5.

Referring to FIG. 5, the device 10 is shown in installed condition upon a conventional spark plug body 25 by longitudinal staking in a manner disclosed in my prior U.S. Pat. No. 3,156,477. In this condition, the flange is inwardly deformed wherein the diameter of the free edge 17 is approximately that of the diameter of the undercut portion of the threaded shank 28 whereby the device is captivated upon the shank. During subsequent installation of the plug, the flanges 11, 13 and 15 are flattened against each other, but owing to the decreased diameter of the free edge 17, the offset areas 18–21, inclusive, are not compressed and remain of an effective thickness approximating that of the medial thickness of the groove separating adjacent threads on the shank 28. It is the presence of this thickness which prevents any tendency of the edge 17 to cross-thread with respect to the shank 28 should the gasket become immobilized with respect to the cylinder head prior to removal of the plug, as when the same is replaced. Thus, the unthreading of the plug with respect to the cylinder head opening ultimately brings the inner end of the thread on the shank to bear upon the locking flange 16 and force it to remain in captivated position.

I wish it to be understood that I do not consider the invention limited to the precise details of structure shown and set forth in this specification, for obvious modifications will occur to those skilled in the art to which the invention pertains.

I claim

1. In a combination spark plug and captive gasket therefor, in which said spark plug includes a plug body having a threaded shank portion extending outwardly from a main body portion, said threaded shank portion including an undercut area adjacent said main body portion, said gasket including a plurality of mutually compressible flanges and a locking flange extending inwardly of said compressible flanges to be engaged wihin said undercut area, said locking flange having a free generally arcuate edge, said threaded shank having a given pitch and defining a continuous spiral recess between adjacent convolutions of thread, the improvement comprising: said arcuate free edge of said locking flange having at least one offset staked area wherein the effective width of said edge at said area is substantially greater than the thickness of metal forming said locking flange; whereby said offset staked areas are prevented from cross-threading the thread on such shank portion to thereby prevent an installed spark plug from becoming unthreaded from a threaded spark plug opening while simultaneously disengaging said gasket from said plug.

2. Structure in accordance with claim 1, further characterized in said staked areas being positioned at arcuate intervals of 90°.

* * * * *